Aug. 2, 1960     H. B. CLIFFORD ET AL     2,947,134
ADJUSTABLE HEADER DEVICE FOR HILLSIDE COMBINE

Filed May 29, 1958     4 Sheets-Sheet 1

INVENTORS.
DONALD HECTOR McNEIL, &
HERBERT BENJAMIN CLIFFORD

BY
ATTORNEYS.

Aug. 2, 1960  H. B. CLIFFORD ET AL  2,947,134
ADJUSTABLE HEADER DEVICE FOR HILLSIDE COMBINE
Filed May 29, 1958  4 Sheets-Sheet 2

INVENTORS.
DONALD HECTOR McNEIL, &
HERBERT BENJAMIN CLIFFORD
BY Carlson, Pitzner,
Hubbard & Wolf
ATTORNEYS.

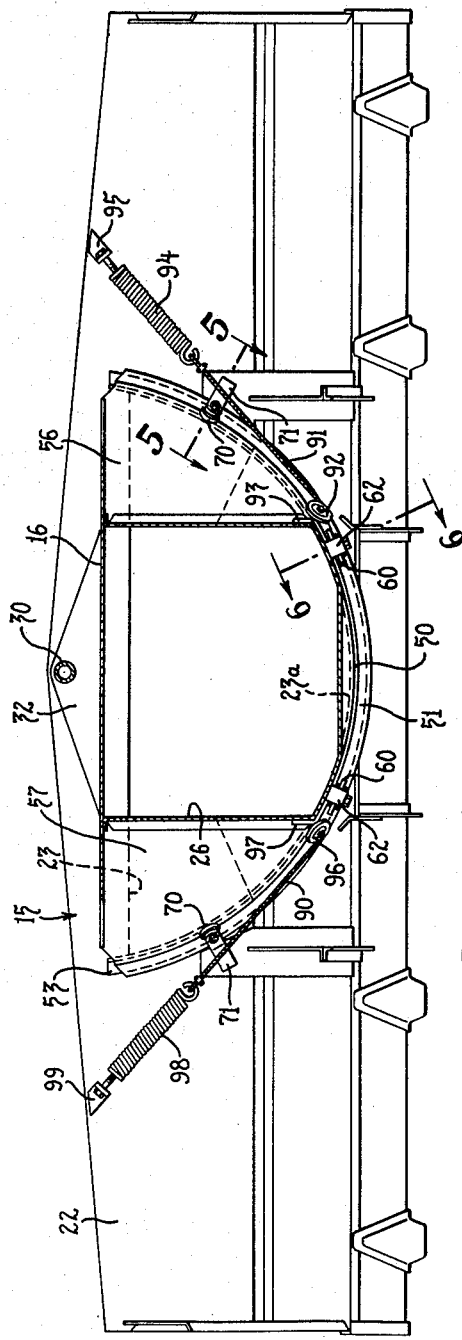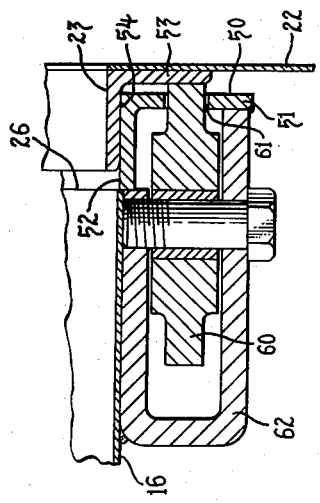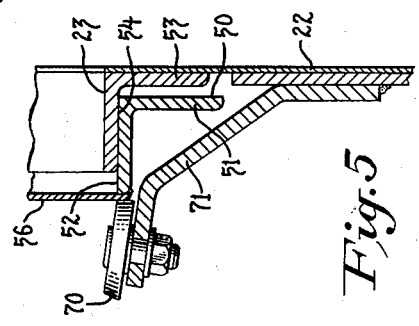

Aug. 2, 1960        H. B. CLIFFORD ET AL        2,947,134
            ADJUSTABLE HEADER DEVICE FOR HILLSIDE COMBINE
Filed May 29, 1958                              4 Sheets-Sheet 4

INVENTORS.
DONALD HECTOR McNEIL, &
HERBERT BENJAMIN CLIFFORD
BY
                ATTORNEYS.

United States Patent Office 2,947,134
Patented Aug. 2, 1960

2,947,134
ADJUSTABLE HEADER DEVICE FOR HILLSIDE COMBINE

Herbert Benjamin Clifford, Sanger, and Donald Hector McNeil, Fresno, Calif., assignors to Massey-Ferguson Inc., Racine, Wis., a corporation of Maryland Filed May 29, 1958, Ser. No. 750,278

7 Claims. (Cl. 56—209)

This invention relates generally to harvesting machines of the self-propelled combine type, and more particularly, to so-called hillside combines adapted to operate along sloping terrain.

A hillside combine is commonly provided with vertically positionable supporting wheels which are properly adjusted to keep the combine body level when moving along sharply sloping ground. In the U.S. Patent to Harp, No. 2,753,675, issued July 10, 1956, and assigned to the assignee of the present invention, an improved hillside combine construction is disclosed and claimed wherein the combine header assembly is longitudinally pivoted and interconnected to the vertically movable wheels so that movement of the wheels to level the combine body also swings the header assembly to maintain the assembly parallel to the ground. In this way, adjustment of the wheels both levels the combine and keeps the header assembly properly oriented with respect to the sloping terrain.

It is the general aim of the present invention to provide an improved pivoted header assembly construction for a hillside combine which permits a large capacity feeder house and elevator to be utilized for carrying harvested material from the header assembly into the combine body.

In more detail, it is an object of the invention to improve the hillside combine construction shown in the above-identified Harp patent by providing a novel header assembly and pivoting arrangement that avoids any constriction of the feed opening between the assembly and the adjoining feeder house or header spout.

It is another object to provide a pivoted header assembly of the above type that turns smoothly on its axis without binding or sticking. It is a related object to provide such an assembly arranged so that its own weight assures a free-turning, but closely fitting, unit which avoids spillage of the harvested material between the header assembly and the adjoining feeder house.

It is also an object to provide a novel and effective arrangement for positively coupling a pivoted header assembly to the positionable wheels of a hillside combine, while providing limited resilience in the connection, so as to avoid inadvertent damage.

It is a further object to provide a pivoted header assembly as characterized above that is strong, economical to manufacture, and especially simple to assembly and service.

Other objects and advantages of the invention will become apparent upon reading the following detailed description and upon reference to the drawings in which:

Fig. 4 is a transverse sectional view taken along the line 4—4 of Fig. 3.

Fig. 5 is an enlarged fragmentary sectional view taken along the line 5—5 of Fig. 4.

Fig. 6 is an enlarged fragmentary sectional view taken along the line 6—6 of Fig. 4.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
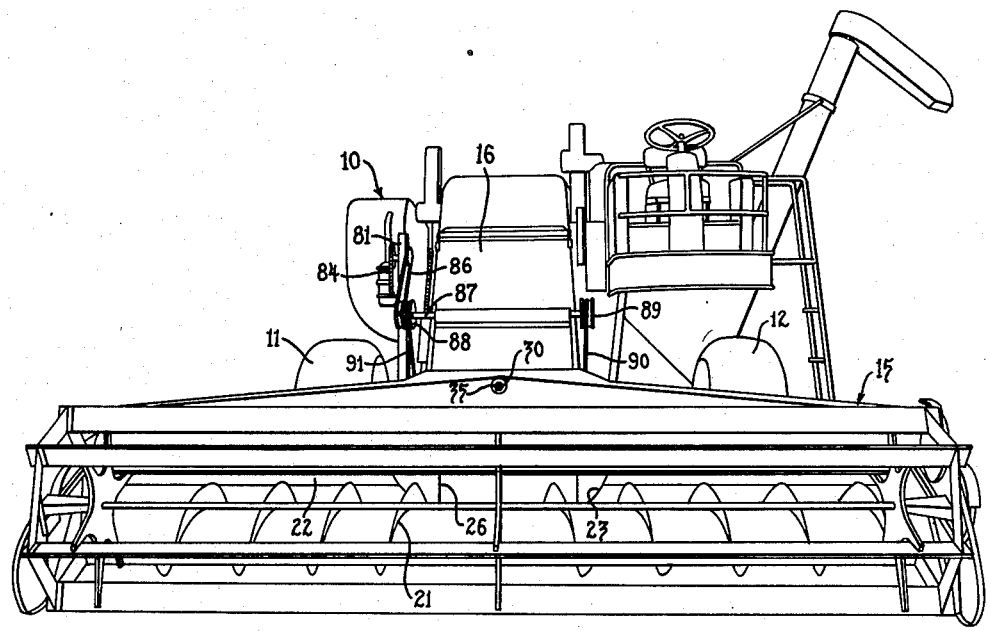
Figure 1 is a front elevation of a hillside combine embodying the present invention.
Figure 2:
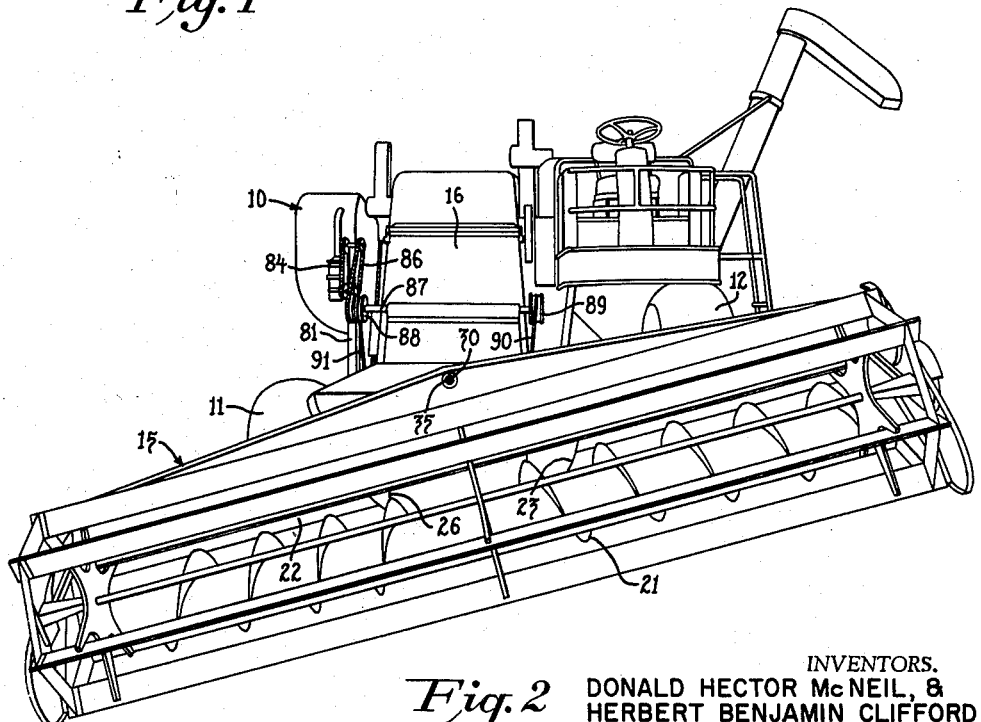
Fig. 2 is similar to Fig. 1 showing the combine adjusted for operation on a hillside.

Turning now to Figs. 1 and 2, there is shown a harvester 10 of the self-propelled combine type that is especially adapted for operation along sloping terrain. A machine of this nature is commonly referred to as a hillside combine. To keep the combine level when it is operating on a hillside, it is provided with vertically positionable driving wheels 11 and 12. In addition, the harvester platform or header assembly 15 is pivoted at the forward end of the header spout or feeder house 16 so as to be swingable about a generally longitudinal axis.

When in normal operation on level ground, the driving wheels 11 and 12 are disposed generally on the same transverse axis, and the header assembly 15 is disposed generally parallel with the axis of the wheels 11, 12 so as to be level with the ground (see Fig. 1). When the combine 10 is operated on a hillside, the vertical positions of the drive wheels 11, 12 are adjusted and the header assembly 15 is swung about its pivot, so that the combine 10 remains horizontal and the header assembly remains generally parallel to the sloping ground surface (see Fig. 2).

The header assembly 15 includes a transverse conveyor 21 and a back wall 22 having a central discharge opening 23. The conveyor 21 is effective to carry harvested material toward the center of the header assembly 15 and to urge it rearwardly through the discharge opening 23.

Figure 3:
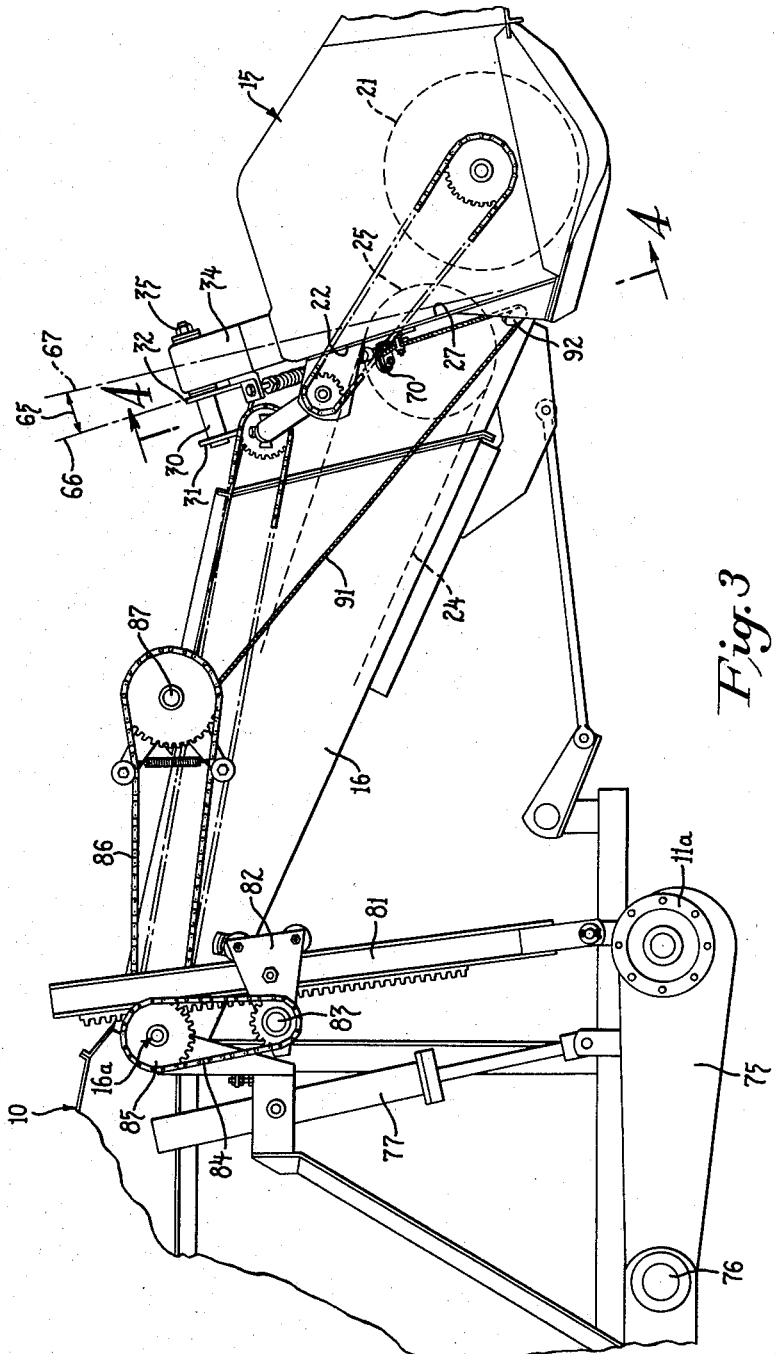
Fig. 3 is a fragmentary side elevation of the forward portion of the combine shown in Figs. 1 and 2.

The feeder house 16 encloses an elevator 24 (see Fig. 3) which projects at 25 through an intake opening 26 formed in the forward face 27 of the feeder house. The back wall 22 of the header assembly overlies the forward face 27 of the feeder house 16, and the discharge opening 23 is generally alined with the intake opening 26 so that the projecting portion 25 of the elevator 24 extends into the header assembly just behind the conveyor 21. The harvested material urged rearwardly by the conveyor 21 is thus engaged by the elevator 25 and carried rearwardly and upwardly through the feeder house into the body of the combine 10.

In accordance with the invention, the header assembly 15 is pivoted on the feeder house 16 along an axis spaced from the intake opening 26, and the discharge opening 23 is segmental in shape so that the passage through the openings 23, 26 remains wide and unobstructed as the header assembly swings about its pivot. In the preferred embodiment, the header assembly 15 is pivoted on a pivot pin 30 which is fixed above the intake opening 26 by a pair of bracket plates 31, 32 on the feeder house 16. The pin 30 passes through a pair of holes 33 formed in the opposite sides of a channel portion 34 at the top of the back wall 22 of the header assembly. A nut 35 is secured on the end of the pivot pin 30 and holds the parts in assembled relation.

Figure 7:
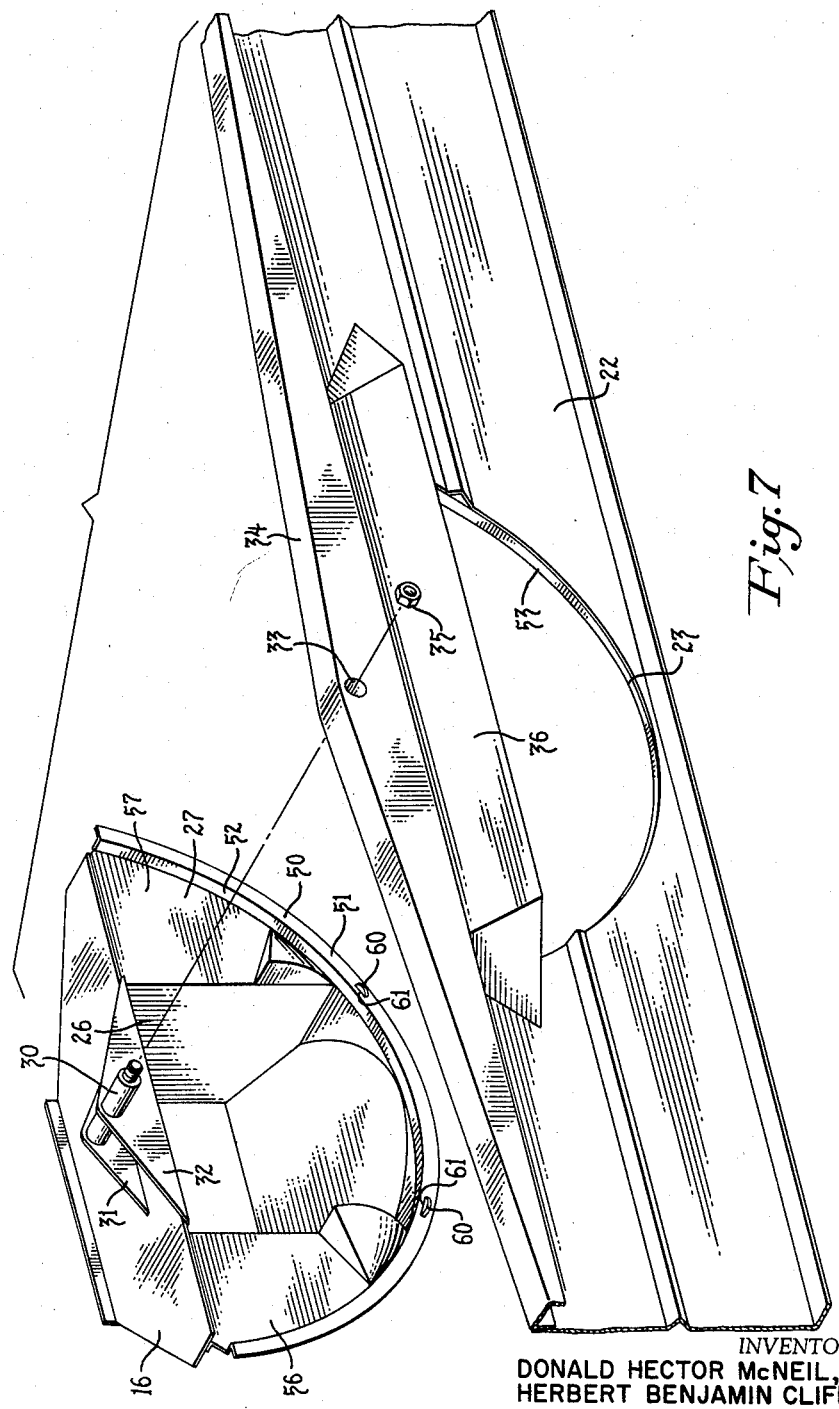
Fig. 7 is an exploded perspective view of a fragmentary portion of the combine appearing in Figs. 1 and 2, with parts removed.

Because of the wide, segmental shape of the discharge opening 23, it will be appreciated that the full scale, large capacity intake opening 26 in the feeder house is not constricted as the header assembly 15 is pivoted to conform with changing ground contours over which the combine operates. In the illustrated embodiment, a shield 36 is mounted on the inner face of the back wall 22 (see Fig. 7) which prevents harvested material from becoming tangled or jammed about the pin 30.

In order to prevent spillage between the back wall 22 and the forward face 27, the face is formed with an arcuate track 50 bounding the lower edge of the opening 26 and being alined with the lower edge 23a of the opening 23. The track 50 and the lower edge 23a have common centers lying on the axis of the pin 30 and are provided with interfitting flanges so as to form a tight joint between the openings 23, 26 in all angular positions of the header assembly. In the illustrated embodiment, a first curved strip of angle iron 51 is secured on the forward face 27 on the feeder house and forms both the track 50 and an axially extending flange 52. A second curved strip of angle iron 53 is secured to the back wall 22 of the header assembly so as to define the lower arcuate edge 23a of the segmental opening 23 as well as an axially extending flange 54 that fits smoothly and closely within the flange 52.

The forward face 27 of the feeder house is also provided with a pair of ear panels 56 and 57 which funnel the harvested material from the segmental opening 23 to the intake opening 26. It will be appreciated that the close fitting flanges 52, 54, together with the ear panels 56, 57, effectively prevent spillage of the harvested material passing through the openings 23, 26 in all angular positions of the header assembly.

For the purpose of allowing the header assembly to swing smoothly about the pivot pin 30, rollers are interposed between the track 50 and the back wall 22 of the header assembly. In the embodiment shown, a pair of rollers 60 are extended through respective spaced openings 61 in the track 50 so as to bear against the angle iron 53 defining the lower arcuate edge 23a of the opening 23. The rollers 60 are journaled in brackets 62 that are secured to the underside of the feeder house 16 (see Fig. 6). The rollers 60 thus provide a virtually frictionless trackway between the header assembly 15 and the feeder house 16.

As a feature of the invention, the forward face 27 of the feeder house is inclined slightly rearwardly so that the weight of the header assembly 15 overlying the face and hanging from the pivot pin 30 holds the back wall 22 snugly against the forward face 27 and thus tends to keep the flanges 52, 54 engaged. In this way, the header assembly rests firmly against the rollers 60 and rides smoothly on the rollers as it swings back and forth about the pin 30. The angle through which the forward face 27 and the feeder house is rearwardly inclined is preferably not great, and in the illustrated embodiment it is an angle 65 of only a few degrees (see Fig. 3). The angle 65 is taken between a line 66 lying in the plane of the forward face 27 of the feeder house and a line 67 which lies in a generally vertical plane when the feeder house 16 is swung about its pivot point 16a to lower the header assembly 15 into operating position.

To prevent the header assembly from swinging forwardly from the track 50, a pair of retaining rollers 70 are positioned behind the edges of the ear panels 56, 57 respectively, and are journaled in brackets 71 secured to the back wall 22 of the header assembly (see Figs. 4 and 5). It will be appreciated that the rollers 70, together with the rollers 60 and the arcuate angle irons 51, 53, provide a turret-like coupling between the header assembly 50 and the feeder house.

It is a further feature of the invention that the vertically positionable wheels 11, 12 are positively coupled to the pivoted header assembly 15, with provision being made affording some resilience in this coupling so that when one side of the header assembly is inadvertently struck against the ground neither the coupling mechanism nor the header assembly will be damaged. In the exemplary combine 10, the wheels 11, 12 are secured to hubs, of which only the hub 11a is shown (see Fig. 3). The hub 11a is carried on the outer end of an arm 75 pivoted at 76 to the main frame of the combine, and the hub for the wheel 12 is similarly mounted. A hydraulic actuator 77 is employed to swing the arm 75, and thus adjustably position the supporting wheel 11 in a vertical direction.

Coupling the positionable wheel 11 to the header assembly 15, is a rack 81 which is held by a slide structure 82 in engagement with a pinion carried by a shaft 83. A chain 84, a sprocket shaft 85 and a chain 86, positively connect the pinion on the shaft 83 with a drum shaft 87 journaled on the top of the feeder house 16 (see Figs. 1 and 3). Carried at each end of the drum shaft 87 are drums 88, 89 having secured thereto cables 90 and 91, respectively.

The cable 91 extends forwardly along the feeder house 16 to a pulley 92 journaled by a bracket 93 on the side of the feeder house. From the pulley 92, the cable 91 extends outwardly behind the back wall 22 and is secured to the header assembly through a relatively heavy spring 94 which is anchored to the header assembly by a bracket 95.

The cable 90, arranged similarly to the cable 91, is trained about a pulley 96 journaled on a bracket 97 and is anchored by a relatively heavy spring 98 secured at 99 to the header assembly.

It can now be seen that as the hydraulic actuator 77 lowers the wheel 11 by forcing the arm 75 downwardly, the rack 81 will, through the chains 84, 86, wind the cable 91 about the drum 88 while simultaneously feeding the cable 90 from the drum 89 so that the header assembly 15 is swung about the pin 30 to conform with the slope of the ground over which the combine 10 is travelling. The springs 94, 98, through which the cables are secured to the header assembly, provide limited resilience in the connection between the wheels and the header assembly, so that the connection can "give" when an obstruction is encountered without damage to the parts.

It will be noted that the header assembly 15 can be quite easily and quickly mounted on the feeder house for assembly, and detached for cleaning or servicing. Simply removing the nut 35 and disconnecting the springs 94, 98 from their respective anchoring brackets 95, 99, permits the header assembly to be dropped free from the feeder house.

We claim as our invention:

1. In a hillside harvester, the combination comprising a feeder house having a forward face with an intake opening formed therein, a header assembly having a back wall overlying said forward face, said header assembly being pivoted on said feeder house along an axis spaced from said intake opening, and said back wall having a segmentally shaped discharge opening formed therein alined with said intake opening so as to form a passage from said header assembly to said feeder house whose open cross section remains substantially equal to said intake opening as the header assembly swings about said pivot.

2. In a hillside harvester, the combination comprising a feeder house having a forward face with an intake opening formed therein, a header assembly having a back wall overlying said forward face, a pin positioned above said intake opening pivoting said header assembly on said feeder house, anti-friction means interposed between said assembly and said house so that the assembly will swing freely on said pin, said back wall having a segmentally shaped discharge opening formed therein alined with said intake opening so as to form a passage from said header assembly to said feeder house whose open cross section remains substantially equal to said intake opening as the header assembly swings about said pivot, and mutually interfitting flanges on said assembly and said house so as to prevent spillage between said face and said wall.

3. In a hillside harvester, the combination comprising a feeder house having a forward face with an intake opening formed therein, a header assembly having a back wall overlying said forward face, said header assembly being pivoted on said feeder house along an axis spaced above said intake opening, said forward face having an arcuate track bounding the lower edge of said intake opening and having its center at said axis, said back wall being formed with a segmentally shaped opening having a lower arcuate edge whose center line lies on said axis and which is generally alined with said track, and said track and said lower arcuate edge having interfitting flange portions so as to prevent spillage between said face and said wall in any angular position of said header assembly.

4. In a hillside harvester, the combination comprising, a feeder house having a forward face with an intake opening formed therein, a header assembly having a back wall overlying said forward face, a pin pivoting said header assembly on said feeder house along an axis spaced above said intake opening, said forward face having an arcuate track bounding the lower edge of said intake opening with its center at said axis, said back wall being formed with a segmental opening having a lower arcuate edge whose center line lies on said axis and which is generally alined with said track, said track and said lower arcuate edge having interfitting flange portions so as to prevent spillage between said face and said wall in any angular position of said header assembly, and a plurality of rollers interposed between said track and said lower edge so as to permit the head assembly to swing smoothly about said pins.

5. In a hillside harvester, the combination comprising a feeder house having a forward face inclined rearwardly and being formed with an intake opening therein, a header assembly having a back wall overlying said inclined forward face so that the weight of said assembly urges said wall against said face, said header assembly being pivoted to said feeder house on an axis spaced above said intake opening, and said back wall having a segmentally shaped discharge opening formed therein alined with said intake opening so as to form a passage from said header assembly to said feeder house whose open cross section remains substantially equal to that of said intake opening as the header assembly swings about said pivot.

6. In a hillside harvester, the combination comprising a feeder house having a forward face inclined rearwardly and being formed with an intake opening therein, a header assembly having a back wall overlying the inclined forward face so that the weight of said assembly urges said wall against said face, said header assembly being pivoted to said feeder house along an axis spaced above said intake opening, said back wall having a discharge opening formed therein and alined with said intake opening, and arcuate interfitting flanges on said house and said assembly, said flanges having said axis as their center.

7. In a hillside harvester, the combination comprising a feeder house having a forward face inclined rearwardly and being formed with an intake opening therein, a header assembly having a back wall overlying the inclined forward face so that the weight of said assembly urges said wall against said face, a pin positioned above said intake opening pivoting said header assembly on said feeder house along an axis generally perpendicular to said face, said back wall having a discharge opening formed therein and alined with said intake opening, a plurality of anti-friction elements interposed between said header assembly and said feeder house so as to bear the weight of the assembly and allow it to swing smoothly about said pin, and means to prevent said header assembly from moving away from said elements.

References Cited in the file of this patent

UNITED STATES PATENTS

| | | |
|---|---|---|
| 2,513,111 | Schiller | June 27, 1950 |
| 2,656,668 | Witzel | Oct. 27, 1953 |
| 2,796,717 | Orelind et al. | June 25, 1957 |